(12) United States Patent
Fisher et al.

(10) Patent No.: US 11,057,687 B2
(45) Date of Patent: Jul. 6, 2021

(54) AUXILIARY INFORMATION IN MANIFESTS

(71) Applicant: WURL INC., Palo Alto, CA (US)

(72) Inventors: Yuval Fisher, Palo Alto, CA (US); Ron Gutman, San Diego, CA (US); Bijal Sutaria, San Jose, CA (US); Ramarao Babbellapati, Fremont, CA (US); Sean Doherty, Palo Alto, CA (US)

(73) Assignee: WURL INC., Palo Alto, CA (US)

( * ) Notice: Subject to any disclaimer, the term of this patent is extended or adjusted under 35 U.S.C. 154(b) by 0 days.

(21) Appl. No.: 16/683,288

(22) Filed: Nov. 14, 2019

(65) Prior Publication Data

US 2021/0152896 A1 May 20, 2021

(51) Int. Cl.
*H04N 7/10* (2006.01)
*H04N 21/858* (2011.01)
*H04N 21/435* (2011.01)
*H04N 21/2662* (2011.01)
*H04N 21/2187* (2011.01)
*H04N 21/643* (2011.01)
*H04N 21/81* (2011.01)

(52) U.S. Cl.
CPC ..... *H04N 21/8586* (2013.01); *H04N 21/2187* (2013.01); *H04N 21/2662* (2013.01); *H04N 21/435* (2013.01); *H04N 21/643* (2013.01); *H04N 21/812* (2013.01)

(58) Field of Classification Search
CPC .......... H04N 21/4627; H04N 21/4725; H04N 21/4786; H04N 21/47205
USPC .......................................................... 725/32
See application file for complete search history.

(56) References Cited

U.S. PATENT DOCUMENTS

| 7,367,508 | B2 | 5/2008 | Christian |
| 9,037,638 | B1 | 5/2015 | Lepeska et al. |
| 2003/0182401 | A1 | 9/2003 | Moriya |
| 2006/0095558 | A1 | 5/2006 | Christian |
| 2007/0276808 | A1 | 11/2007 | McGushion |
| 2013/0042016 | A1* | 2/2013 | Perkuhn ............... H04L 67/1044 709/231 |
| 2013/0163758 | A1 | 6/2013 | Swaminathan et al. |
| 2014/0316899 | A1 | 10/2014 | McGowan et al. |
| 2015/0382075 | A1 | 12/2015 | Neumeier et al. |
| 2016/0021201 | A1 | 1/2016 | Chen et al. |
| 2016/0092852 | A1 | 3/2016 | Boggs et al. |
| 2017/0118263 | A1 | 4/2017 | Crabtree et al. |
| 2017/0359628 | A1 | 12/2017 | Sachdev et al. |
| 2020/0267435 | A1* | 8/2020 | Gordon ............... H04N 21/4627 |

* cited by examiner

*Primary Examiner* — Jivka A Rabovianski
(74) *Attorney, Agent, or Firm* — Kligler & Associates Patent Attorneys Ltd

(57) ABSTRACT

A method of video distribution including receiving a manifest including links to blocks, which blocks form at least a portion of a video program, selecting at least some of the links in the manifest, to which auxiliary information is to be added and adding, to each of the selected links, auxiliary information, which does not affect a block referred to by the link. A log of links requested by clients is retrieved from a storage unit, links relating to a specific video program are filtered from the retrieved log, and information on an extent to which the specific video program was viewed, is determined responsive to the filtered links.

23 Claims, 2 Drawing Sheets

AUXILIARY INFORMATION IN MANIFESTS

FIELD OF THE INVENTION

The present invention relates generally to video distribution, and particularly to collection of information on distributed video.

BACKGROUND

Adaptive titrate (ABR) video streams are used to deliver video streams to clients. In some cases, the video streams are delivered in accordance with a suitable protocol, such as dynamic adaptive streaming over HTTP (DASH) or HTTP live streaming (HLS). When a client requests video content, the client is serviced with one or more manifests which include a list of links, such as URL addresses, of files containing fragments of the requested video content. The manifest may include multiple links for a single fragment of the video content, corresponding to different bitrates and/or resolutions. A single manifest may contain links to fragments covering the entire video asset or each manifest in a sequence of manifests contains links to a sub-portion of the video asset. The manifests optionally include links to further manifests in the sequence, or the client refreshes a request for the manifest to receive an updated manifest. Alternatively, the manifest indicates a function used by the client to programmatically determine fragment URLs forward in time.

US patent publication 2006/0095558 relates to URLs which include tracking information encoded therein.

US patent publication 2017/0118263, to Crabtree et al., describes client devices configured to respond at regular intervals whilst receiving a multicast video stream, by transmitting an HTTP HEAD request message to a content server. The number of client devices receiving the video stream is determined based on the number of manifest requests received at the content server.

SUMMARY

Embodiments of the present invention that are described hereinbelow provide methods and apparatus for tracking the usage of links of a manifest.

There is therefore provided in accordance with an embodiment of the present invention, a method of video distribution, including receiving, by a processor, a manifest including links to blocks, which blocks form at least a portion of a video program, selecting, by the processor, at least some of the links in the manifest, to which auxiliary information is to be added and adding, to each of the selected links, auxiliary information, which does not affect a block referred to by the link. The method further includes retrieving from a storage unit, a log of links requested by clients, wherein at least some of the links in the log include the added auxiliary information, filtering from the retrieved log, links relating to a specific video program, and determining information on an extent to which the specific video program was viewed, responsive to the filtered links.

Optionally, selecting the links to which auxiliary information is to be added comprises selecting each predetermined number of links, wherein the predetermined number is at least five. Optionally, selecting the links to which auxiliary information is to be added comprises selecting links adjacent a link representing an advertisement slot. Optionally, adding, to each of the selected links, auxiliary information comprises adding auxiliary information on the advertisement slot to the selected link adjacent the link representing an advertisement slot. Optionally, selecting the links to which auxiliary information is to be added comprises selecting a first percentage of links to a first content type and a second percentage of links to a second content type, wherein the first percentage is different from the second percentage. Optionally, selecting the links to which auxiliary information is to be added comprises selecting less than 20% of links to content blocks and more than 40% of links to advertisement slots.

Optionally, adding, to each of the selected links, auxiliary information comprises adding content related metadata. Optionally, adding content related metadata comprises adding an identifier of the video program or of the video channel. Optionally, adding, to each of the selected links, auxiliary information comprises adding an identifier of a distributor of the blocks pointed to by the links or of a geographical area in which the blocks pointed to by the links are distributed. Optionally, adding, to each of the selected links, auxiliary information comprises adding to each selected link, a duration of a block pointed to by the link. Optionally, adding, to each of the selected links, auxiliary information comprises adding to each selected link, a duration of a sequence of plurality of blocks of the video program including the block pointed to by the link.

Optionally, adding, to each of the selected links, auxiliary information comprises adding to each selected link a same set of auxiliary information fields. Optionally, adding, to each of the selected links, auxiliary information comprises adding to each selected link a set of auxiliary information fields, wherein the sets of fields added to different links include different numbers of fields. Optionally, adding, to each of the selected links, auxiliary information comprises adding an identifier of a rendition of the blocks pointed to by the links. Optionally, the method includes changing a plurality of the links of the manifest to point to one or more redirection servers. Optionally, the method includes changing the plurality of the links comprises changing a first plurality of the links to point to a first redirection server and changing a second plurality of the links to point to a second redirection server. Optionally, the method includes adding dummy links pointing to empty blocks to the manifest, wherein the dummy links include auxiliary information.

There is further provided in accordance with an embodiment of the present invention, a apparatus for video distribution, comprising a first processor configured to receive a manifest including links to blocks, which blocks form at least a portion of a video program, to select at least some of the links in the manifest, to which auxiliary information is to be added, to add to each of the selected links, auxiliary information, which does not affect a block referred to by the link, and a second processor configured to retrieve a log of links requested by clients, from a storage unit, wherein at least some of the links in the log include the added auxiliary information, to filter from the retrieved log, links relating to a specific video program, and to determine information on an extent to which the specific video program was viewed, responsive to the filtered links.

Optionally, the first processor is configured to select each predetermined number of links, in selecting the links to which auxiliary information is to be added, wherein the predetermined number is at least five. Optionally, the first processor is configured to select links adjacent a link representing an advertisement slot, in selecting the links to which auxiliary information is to be added. Optionally, the first processor is configured to add auxiliary information on the advertisement slot to the selected link adjacent the link representing the advertisement slot.

The present invention will be more fully understood from the following detailed description of the embodiments thereof, taken together with the drawings in which:

DETAILED DESCRIPTION OF EMBODIMENTS

An aspect of some embodiments of the present invention relates to a system for placing auxiliary information in links in video manifests. An operator collects the auxiliary information from links collected in logs of requests for video blocks serviced by a content distribution network (CDN). The auxiliary information allows quick retrieval of information about the video blocks actually supplied to clients. By inserting the auxiliary information, viewership information may be collected merely by filtering the logs, without requiring a look up in a database which provides the corresponding information of each link. Thus, the processing power required to collect the viewership information is reduced drastically.

Optionally, the auxiliary information includes information which is ignored and not used by the server, which services the blocks based on the links.

In some embodiments, some or all of the links to which auxiliary information is added are replaced by a link to a redirection server, which collects a log of the requests and redirects the requests to the CDN. This simplifies the process of retrieving the logs, and in cases in which not all the links include auxiliary information, reduces the size of the logs and thus simplifies their handling. In some embodiments, a plurality of redirection servers are used and links to different types of blocks are directed to different redirection servers. For example, a first redirection server may be used for program content, while a second redirection server is used for advertisements.

Figure 1:
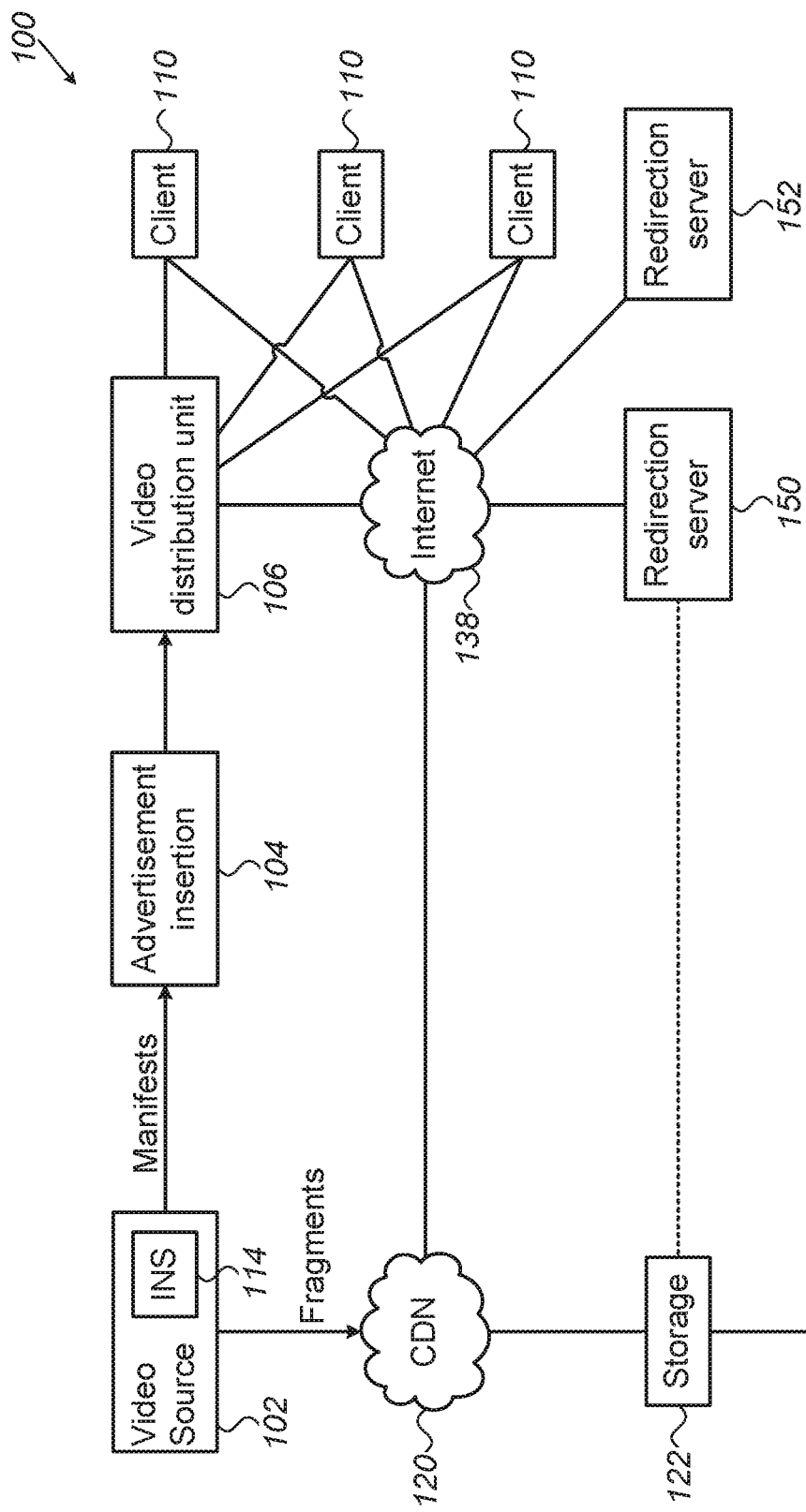
FIG. 1 is a schematic block diagram of a video provision system, in accordance with an embodiment of the invention.

FIG. 1 is a schematic illustration of a video provision system 100, in accordance with an embodiment of the invention. System 100 optionally includes a video source 102 which provides video streams in the form of fragments and manifests with links to the fragments required to view the entire video stream. The fragments are provided to a content distribution network (CDN) 120, which is configured to provide the fragments in response to requests from clients 110. In some embodiments, the manifests from video source 102 are provided to an advertisement insertion unit 104, which inserts links to advertisements to the manifests. The manifests are then provided to a video distribution unit 106, which provides the manifests to clients 110 in response to requests for video streams.

Clients 110 send requests for video content (e.g., video playback requests), over the Internet 138 or any other suitable network, to video distribution unit 106. Video distribution unit 106 responds to each request with a corresponding manifest listing video data blocks forming the requested video content. Client 110 then sends block retrieval requests, for the video content blocks identified in the manifest, to CDN 120.

CDN 120 generally comprises a plurality of servers, in different geographical areas, configured to respond to client retrieval requests. In some embodiments, the servers of CDN 120 are configured to operate a distributed protocol which synchronizes their operation.

In some embodiments, CDN 120 comprises a storage unit 122 in which a log of the block retrieval requests is stored. While a single storage unit 122 is shown, in other embodiments, the logs are stored in a distributed storage unit formed of a plurality of separate memory units, managed by CDN 120 in accordance with the distributed protocol.

An operator station 140 is optionally used to retrieve and display the information in the logs in storage unit 122, in accordance with methods known in the art.

The manifest provided by the ad placement unit 102, optionally covers the entire requested video content. This option may be used, for example, when the requested video content is a stored video, such as in a video on demand (VOD) service. Alternatively, the provided manifest covers only a short segment of the requested video, for example covering several seconds. To receive further segments of the requested video, the client optionally resends the request and receives a manifest corresponding to a subsequent segment of the video content. Alternatively, the manifest includes a link to one or more further manifests that the client should request to receive further portions of the requested video content.

The system configuration shown in FIG. 1 is an example configuration, which is chosen purely for the sake of conceptual clarity. Alternatively, any other suitable system configuration can be used. Generally, the different elements of system 100 may be implemented using software, hardware or a combination of hardware and software elements. In some embodiments, video source 102 and/or operator station 140 comprise general-purpose processors programmed in software to carry out the functions described herein. The software may be downloaded to the computer in optical or electronic form, over a network, for example, or it may, additionally or alternatively, be provided and/or stored on non-transitory tangible media, such as magnetic, optical, or electronic memory.

In some embodiments, video source 102 includes an auxiliary information insertion unit 114 which adds to the links in the manifest, auxiliary information which does not change the block pointed to by the link. Optionally, the auxiliary information is not used by CDN 120 and is merely logged in storage unit 122 along with the links to which it is added. The inclusion of the auxiliary information in the CDN log, allows the operator station 140 a simple way to collect the auxiliary information. While the operator station 140 could store the auxiliary information in an index together with corresponding links in a manner allowing lookup of the auxiliary information based on the links in the logs, including the auxiliary information in the links makes the task of collecting the auxiliary information much easier and avoids the need of managing such an index.

The log optionally stores the links requested by the users along with information on the requesting user, such as an address (e.g., IP address) of the requesting user, a device type of the requesting user, and a time of the request.

In some embodiments, auxiliary information insertion unit 114 is implemented in software on a processor which performs other tasks of video source 102. In other embodiments, auxiliary information insertion unit 114 is implemented in software, firmware and/or hardware on a separate hardware unit in video source 102. Alternatively to auxiliary information insertion unit 114 being located within video source 102, auxiliary information insertion unit 114 is located between video source 102 and advertisement insertion unit 104 or between advertisement insertion unit 104 and video distribution unit 106. In accordance with this alternative, auxiliary information insertion unit 114 optionally intercepts packets transmitted from video source 102 with manifests and their links, extracts the links, inserts the auxiliary information and repackages the links into packets. In other embodiments in accordance with this alternative, the manifest and/or links are provided to auxiliary information insertion unit 114 in a proprietary format or any other suitable format and auxiliary information insertion unit 114 packetizes the packets after adding the auxiliary information.

Positioning auxiliary information insertion unit 114 between advertisement insertion unit 104 and video distribution unit 106, allows insertion of auxiliary information into the links to blocks of advertisements that are not generated by video source 102.

It is noted that instead of a single auxiliary information insertion unit 114, a plurality of auxiliary information insertion units are employed. For example, a first auxiliary information insertion unit 114 is located in video source 102 and a second auxiliary information insertion unit is located after or within advertisement insertion unit 104.

The manifests from video source 102 are optionally provided to advertisement insertion unit 104 with empty slots intended for insertion of advertisements by advertisement insertion unit 104. Optionally, video source 102 places in the empty slots links to a filler block to be used by clients 110, in case the slot is not filled by an advertisement. Advertisement insertion unit 104 replaces the links to the filler block with links to blocks forming advertisements. If a link to a filler block is requested by a client 110, the slot was not filled with an advertisement.

It is noted that although the above description relates to embodiments including advertisement insertion unit 104, in other embodiments advertisement insertion unit 104 is not included and the manifests are supplied directly from video source 102 to video distribution unit 106.

As to selecting (208) the links to which auxiliary information is to be added, optionally, the auxiliary information is added to all the links in the manifests. Alternatively, the auxiliary information is added only to a sub-group of the links, for example, to a predefined percentage of the links, such as every predetermined number of links and/or links of a specific type (e.g., links to filler blocks placed in slots to be replaced by advertisements, links to advertisements fixed in the video program). In some embodiments, the selected (208) links to which auxiliary information is to be added include at least 10%, at least 20% or even at least 50% of the links in the manifest, in order to provide the auxiliary information with high granularity. In other embodiments, the selected (208) links to which auxiliary information is to be added include fewer than 20%, fewer than 10%, fewer than 5% or even fewer than 3% of the links in the manifest, in order to minimize the overhead involved in handling the auxiliary information.

In some embodiments, auxiliary information is added to different links in different rates. For example, auxiliary information may be added to links to blocks of the program content at a low rate such as less than 4% of the links, while auxiliary information is added to links to advertisement slots at a high rate of at least 25%, 50% or even 100% (i.e., all the advertisement slots).

Optionally, the links are Uniform Resource Locator (URL) addresses. In some embodiments, the auxiliary information is added to the URL path of the link. Alternatively, the auxiliary information is added to a Uniform Resource Name (URN) portion and/or to query parameters of the link.

In one exemplary embodiment, the links in the manifest are HTTP links and the auxiliary information is added in one or more parameter fields.

For example, instead of a link of the form:
/playlist 1280×720 3000 k 219184.t
a link including auxiliary information is provided in the following form:
/playlist 1280×720 3000 k 219184.t interval=59.0000& pdt=2019-02-08T23:00:47.929Z&Episode="FailArmy Ice Falls" &rendition=1&pod_duration=120

The auxiliary information in the above example, includes a plurality of fields separated by a delimiter, which in this case is the sign "&". The fields in the example include:
1) interval—the time since the previous link including auxiliary information
2) pdt—the date and time of the creation of the video
3) Episode—the name of the video
4) rendition—an indication of the resolution and/or bit-rate of the block
5) pod_duration—ad break duration in seconds It is noted that the above list of fields in the auxiliary information is brought as an example and that in other embodiments other fields may be included. Optionally, the same set of fields is included in all the links to which auxiliary information is added. In other embodiments, different sets of fields of auxiliary information are added to different links. For example, more fields of auxiliary information are optionally added to links to advertisements than to links to program content. In some embodiments, more fields of auxiliary information are added to links to advertisement slots than to links to advertisement blocks added by insertion unit 114.

In some embodiments, the auxiliary information is encrypted by auxiliary information insertion unit 114, for example by an encryption processor embedded therein and/or by a software encryption module of auxiliary information insertion unit 114. Alternatively, the auxiliary information is encrypted in advance and provided to auxiliary information insertion unit 114 already encrypted.

The auxiliary information optionally includes a duration of the block referred to by the URL to which the auxiliary information is added, or of a sequence of blocks ending with the block referred to by the URL to which the auxiliary information is added. For example, in some embodiments, auxiliary information is added to every predetermined number (e.g., 5, 10) of links, and the duration indicated by the auxiliary information indicates the duration of the blocks from the previous link to which the duration was added, until the block pointed to by the current link to which the duration is added.

The durations will be stored in the CDN log along with the corresponding links and can be easily retrieved therefrom by the operator station 140, to determine the actual length of the video segments viewed by users.

In some embodiments, the auxiliary information includes the program name of the program to which the block referred to by the link belongs. Alternatively or additionally, the auxiliary information includes any other content related metadata, such as genre, category, episode name, series name, season number, program ID, product placement, and licensing information.

In some embodiments, video source 102 adds to links to filler blocks representing advertisement slots, auxiliary information which indicates the time of the advertisements until the current slot in which the link is located, and/or the time of the video program from its beginning to the current slot. Alternatively or additionally, the added auxiliary information includes a serial number of the current advertisement slot in the video program.

In some embodiments, the auxiliary information includes metadata on the rendition or encoding of the video data in the block, such as bitrate, frame rate and/or frame size.

The auxiliary information added to each link relates, in some embodiments, only to the block referred to by that link. In other embodiments, the auxiliary information added to some or all of the links relates to other blocks than to the block referred to by the link, in addition to, or instead of, referring to the block referred to by the link. For example, in some embodiments, the auxiliary information added to a link relates to a sequence of blocks beginning, ending, or otherwise related to the block pointed to by the link. Relating to a sequence of a plurality of blocks reduces the number of links to which auxiliary information is added and thus simplifies both the insertion of the auxiliary information and the extraction of the auxiliary information from the logs.

The auxiliary information pertaining to advertisement slots is added, in some embodiments in which auxiliary information is not added to some of the links, to a link to a block adjacent to the slot in the video program. This is particularly useful in cases in which auxiliary information insertion unit 114 cannot add auxiliary information to links to advertisements.

In some embodiments, the auxiliary information includes sequence numbers assigned in accordance with the order of the blocks in the video program. The sequence numbers are optionally used by operator station 140 to identify missing links, indicative of replacement of the link by a link to an advertisement.

Optionally, auxiliary information insertion unit 114 is located in or downstream of video distribution unit 106. In some embodiments in accordance with this option, the auxiliary information includes a unique session identifier, added to the links of a manifest being supplied to a client 110 at a specific time. The unique session identifier can be used to identify links belonging to a single session. In other embodiments, links belonging to a single session are identified based on the program name included in the auxiliary information, and an identification of the client 110 requesting the video program, logged with the links.

In some embodiments, auxiliary information insertion unit 114 inserts, to the manifest, dummy links which lead to empty blocks. The only purpose of the dummy links is to convey auxiliary information to the log. For example, for each link to a filler block which may be replaced by an advertisement, an adjacent dummy link is added to the manifest along with auxiliary information related to the advertisement.

Figure 2:
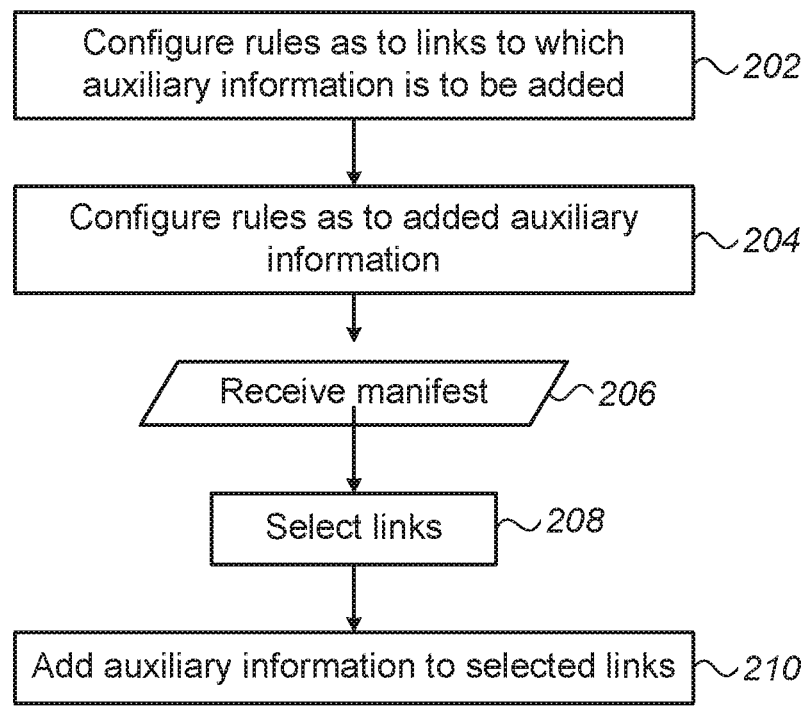
FIG. 2 is a flowchart of acts performed by an operator in adding auxiliary information to a manifest, in accordance with an embodiment of the invention.

FIG. 2 is a flowchart of acts performed by an operator in adding auxiliary information to a manifest, in accordance with an embodiment of the invention.

Auxiliary information insertion unit 114 is configured (202) with rules as to the links to which auxiliary information is to be added. In addition, auxiliary information insertion unit 114 is configured (204) with rules as to the auxiliary information to be added. Upon receiving (206) a manifest, auxiliary information insertion unit 114 selects (208) the links to which auxiliary information is to be added, and adds (210) the auxiliary information to be added according to the configured rules.

The adding (210) of the auxiliary information to the links in the manifest is optionally performed in advance, before a request for the manifest is received from the client. Alternatively, the adding (210) of the auxiliary information is performed in real time after the request for the manifest was received from the client.

In some embodiments, in addition to adding the auxiliary information, the addresses of the links are changed to lead to a redirection server (150, FIG. 1). The redirection server 150 is configured to log the requests in storage 122 and to redirect the requests to the CDN 120, for example by sending HTTP redirection responses, instructing the clients 110 to fetch the requested blocks from CDN 120. In these embodiments, there is no need to access a log managed by the CDN 120 and operator station 140 connects to redirection server 150 to extract the logged information. This simplifies the process of retrieving the logs, and in cases in which not all the links include auxiliary information, reduces the size of the logs and thus simplifies their handling. In some embodiments, the redirection responses remove some or all of the auxiliary information from the links, such that the removed auxiliary information does not reach the CDN.

In some embodiments, a plurality of redirection servers (150, 152) are used and links to different types of blocks are directed to different servers. For example, a first redirection server may be used for program content, while a second redirection server is used for advertisements. In some embodiments, the CDN logging (or a first redirection server) is normally used for links to which auxiliary information is added, while a second redirection server is used for special links for which fast viewership feedback is desired. For example, links to blocks of a specific campaign of interest are directed to a specific redirection server which can be used to evaluate the effectiveness of the specific campaign. Alternatively or additionally, different redirection servers are provided for different content providers and/or distributors, allowing each content provider and/or distributor to collect the log information from its respective redirection server, without exposing the content provider and/or distributor to log information of other entities.

In some embodiments, the redirection server 150 always redirects the client directly to CDN 120. Alternatively, in some cases, specific links of interest are redirected by a first redirection server to a second redirection server, which directs the client to the server. This may be used when desired to allow collection of the auxiliary information by a plurality of different entities from respective different redirection servers. Optionally, links which are to be directed to the second redirection server are marked in the auxiliary information by a special beacon which indicates the need to redirect the link to the second redirection server and/or with an indication of the second redirection server to which the client is to be redirected.

Figure 3:
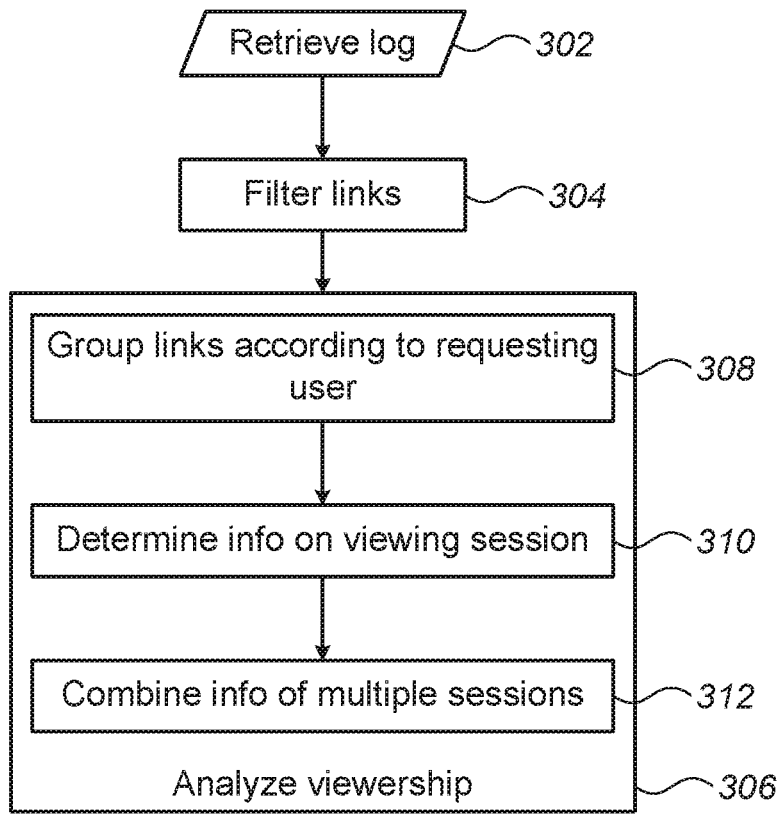
FIG. 3 is a flowchart of acts performed by an operator in collecting viewership information, in accordance with an embodiment of the invention.

FIG. 3 is a flowchart of acts performed by an operator in collecting viewership information, in accordance with an embodiment of the invention.

The operator optionally retrieves (302) a log of links included in blocks requests, of blocks provided by the operator, from storage unit 122. The log is filtered (304) for links relating to a specific video program. The logged links relating to the specific video program are analyzed (306) to extract viewership information of the program. In some embodiments, the analysis (306) includes grouping (308) the links according to the requesting user, and for links associated with each requesting user, determining (310) information on the user's viewing session, such as the duration of the viewing session. In some embodiments, the information on the viewing sessions of the users is combined (312) to provide general statistics on the viewing of the video program.

In some embodiments, the auxiliary information includes a unique ID of the video program to which the block referred to by the link belongs. The filtering (304) in these embodiments is performed simply by identifying the links in the log that include the unique ID of the video program. Alternatively, operator station 140 stores a list which correlates between links and the programs to which the blocks referred to by the links belong.

When auxiliary information is added only to some of the links, the filtering (304) optionally only extracts links to which auxiliary information was added and only these links are considered.

In some embodiments, the auxiliary information of some of the links includes a beacon which is used for quick filtering of links of interest. Such a beacon is used, for example, for links to blocks belonging to a specific campaign of particular interest.

Optionally, determining (310) the information on the user's viewing session comprises determining the duration of the viewing session. The auxiliary information optionally includes for each block or group of blocks an indication of the duration of the block. In determining (310) the duration of the viewing session, operator station 140 optionally simply adds the durations in auxiliary information of the links belonging to the viewing session.

Determining (310) the information on the user's viewing session optionally comprises determining information on the advertisements viewed during the viewing session. Optionally, the number of slots to which advertisements were not entered is determined by counting the links to filler blocks during the viewing session. In some embodiments, the auxiliary information inserted into the links to the filler blocks includes the durations of the corresponding slots and operator station 140 determines the duration of the slots that were not filled with advertisements by adding the durations in the links to the filler blocks. Using knowledge on the total number of advertisement slots or the rate of advertisement slots in the video program, operator station 140 determines the number and/or duration of advertisements viewed during the viewing session. Alternatively, the auxiliary information for advertisement blocks is added to links to adjacent program blocks and is extracted therefrom.

In some embodiments, determining (310) the information includes estimating the bandwidth of the communication link to the client. The estimate is optionally made based on bitrate parameters added by the clients to the links sent to the CDN 120 in their block requests. The bitrate parameters include, for example, an indication of a block size requested from among several available block sizes provided by the CDN 120 for the video program. Alternatively, the bitrate parameters include an indication of a desired frame rate and/or compression ratio.

The combined (312) information includes, for example, the number of viewers that watched the video program, the number of distinct users that watched the program, the number of distinct users that watched the program during a specific time window (e.g. a day, a week), the number of distinct sessions of watching the program, the number of users the watched the video program at specific times, the maximal number of users that watched the video program simultaneously, the total time that users watched the program, an average time that each user watched the program, the types of viewing devices used by users watching the video program, the average duration of watching the video program for users watching the program with a specific device type and/or at a specific bit rate or resolution, and/or the times of day and/or the week days in which the viewing rate was highest.

In some embodiments, the combined (312) information includes a total number and/or duration of advertisements viewed by users watching the video program. Alternatively or additionally, the combined (312) information includes an average number and/or duration of advertisements viewed by users watching the video program.

Optionally, the combined (312) information is generated and provided to the operator without dependence on advertisement insertion unit 104 or any other component of video provision system 100, beyond the standard mechanism of receiving logs from storage unit 122.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method of video distribution, comprising:
receiving, by a processor, a manifest including links to blocks, which blocks form at least a portion of a video program;
selecting, by the processor, at least some of the links in the manifest, for addition of auxiliary information;
adding, to each of the selected links or to links adjacent the selected links, auxiliary information, which does not affect a block referred to by the link;
retrieving from a storage unit, a log of links requested by clients, wherein at least some of the links in the log include the added auxiliary information;
filtering from the retrieved log, links relating to a specific video program; and
determining information on an extent to which the specific video program was viewed, responsive to the filtered links,
wherein the links included in the manifest comprise first links pointing to blocks including content of the video program and second links pointing to blocks in advertisement slots,
wherein selecting the links for addition of the auxiliary information comprises selecting a first percentage of the first links and a second percentage of the second links, wherein the first percentage is different from the second percentage, and
wherein selecting the links for addition of the auxiliary information comprises selecting less than 20% of the first links and more than 40% of the second links.

2. The method of claim 1, wherein selecting the links for addition of the auxiliary information comprises selecting each predetermined number of links, wherein the predetermined number is at least five.

3. The method of claim 1, wherein adding the auxiliary information comprises adding the auxiliary information to the selected link, when the selected link points to a block including content of the video program and adding the auxiliary information to a link adjacent the selected link when the link points to an advertisement slot.

4. The method of claim 3, wherein adding the auxiliary information comprises adding the auxiliary information on a specific advertisement slot to a link adjacent the link representing the specific advertisement slot.

5. The method of claim 1, wherein selecting the links for addition of the auxiliary information comprises selecting fewer than 20% of the links in the manifest.

6. The method of claim 1, wherein adding the auxiliary information comprises adding content related metadata.

7. The method of claim 6, wherein adding content related metadata comprises adding an identifier of the video program or of the video channel.

8. The method of claim 1, wherein adding the auxiliary information comprises adding an identifier of a distributor of the blocks pointed to by the links or of a geographical area in which the blocks pointed to by the links are distributed.

9. The method of claim 1, wherein adding the auxiliary information comprises adding to each selected link, a duration of a block pointed to by the link.

10. The method of claim 1, wherein adding the auxiliary information comprises adding to each selected link, a duration of a sequence of plurality of blocks of the video program including the block pointed to by the link.

11. The method of claim 1, wherein adding the auxiliary information comprises adding to each selected link a same set of auxiliary information fields.

12. The method of claim 1, wherein adding the auxiliary information comprises adding to each selected link a set of auxiliary information fields, wherein the sets of fields added to different links include different numbers of fields.

13. The method of claim 1, wherein adding the auxiliary information comprises adding an identifier of a rendition of the blocks pointed to by the links.

14. The method of claim 1, further comprising changing a plurality of the links of the manifest to point to one or more redirection servers.

15. The method of claim 14, wherein changing the plurality of the links comprises changing a first plurality of the links to point to a first redirection server and changing a second plurality of the links to point to a second redirection server.

16. The method of claim 1, further comprising adding dummy links pointing to empty blocks to the manifest, wherein the dummy links include the auxiliary information.

17. The method of claim 1, wherein selecting the links for addition of the auxiliary information comprises selecting fewer than 4% of the links to content blocks.

18. The method of claim 1, wherein selecting the links for addition of the auxiliary information comprises selecting at least 50% of the links to advertisement slots.

19. The method of claim 1, wherein selecting the links for addition of the auxiliary information comprises selecting at least 10% of the links in the manifest.

20. An apparatus for video distribution, comprising:
a first processor configured to receive a manifest including links to blocks, which blocks form at least a portion of a video program, to select at least some of the links in the manifest, for addition of auxiliary information, to add to each of the selected links or to links adjacent the selected links, auxiliary information, which does not affect a block referred to by the link, and
a second processor configured to retrieve a log of links requested by clients, from a storage unit, wherein at least some of the links in the log include the added auxiliary information, to filter from the retrieved log, links relating to a specific video program, and to determine information on an extent to which the specific video program was viewed, responsive to the filtered links,
wherein the links included in the manifest comprise first links pointing to blocks including content of the video program and second links pointing to blocks in advertisement slots,
wherein selecting the links for addition of the auxiliary information comprises selecting a first percentage of the first links and a second percentage of the second links, wherein the first percentage is different from the second percentage, and
wherein selecting the links for addition of the auxiliary information comprises selecting less than 20% of the first links and more than 40% of the second links.

21. The apparatus of claim 20, wherein the first processor is configured to select each predetermined number of links, in selecting the links for addition of the auxiliary information, wherein the predetermined number is at least five.

22. The apparatus of claim 20, wherein the first processor is configured to add the auxiliary information to the selected link, when the selected link points to a block including content of the video program and to add the auxiliary information to a link adjacent the selected link when the link points to an advertisement slot.

23. The apparatus of claim 22, wherein the first processor is configured to add the auxiliary information on a specific advertisement slot to the selected link adjacent the link representing the specific advertisement slot.

\* \* \* \* \*